United States Patent
Nagata

(10) Patent No.: US 11,487,290 B2
(45) Date of Patent: Nov. 1, 2022

(54) SYSTEMS AND METHODS FOR TRACKING AN ACCESSORY BY A WHEELCHAIR AND COUPLING THE WHEELCHAIR TO THE ACCESSORY

(71) Applicant: Toyota Motor North America, Inc., Plano, TX (US)

(72) Inventor: Katsumi Nagata, Foster City, CA (US)

(73) Assignee: Toyota Motor North America, Inc., Plano, TX (US)

( * ) Notice: Subject to any disclaimer, the term of this patent is extended or adjusted under 35 U.S.C. 154(b) by 118 days.

(21) Appl. No.: 16/595,588

(22) Filed: Oct. 8, 2019

(65) Prior Publication Data
US 2021/0103284 A1    Apr. 8, 2021

(51) Int. Cl.
*G05D 1/00* (2006.01)
*A61G 5/04* (2013.01)
(Continued)

(52) U.S. Cl.
CPC ............. *G05D 1/0094* (2013.01); *A61G 5/04* (2013.01); *A61G 5/10* (2013.01); *B60D 1/04* (2013.01);
(Continued)

(58) Field of Classification Search
CPC .. G05D 1/0094; G05D 1/0231; G05D 1/0278; G05D 1/028; A61G 5/04;
(Continued)

(56) References Cited

U.S. PATENT DOCUMENTS

| 9,940,491 B2 | 4/2018 | Lim et al. | |
| 2009/0012666 A1* | 1/2009 | Simpson | G05D 1/0293 701/23 |

(Continued)

FOREIGN PATENT DOCUMENTS

| CN | 2659399 Y | 12/2004 |
| CN | 109484216 A | 3/2019 |

(Continued)

OTHER PUBLICATIONS

Lombardi, C. et al., "MIT wheelchair steers clear with Wi-Fi", Sep. 22, 2008; URL: https://www.cnet.com/news/mit-wheelchair-steers-clear-with-wi-fi/.

*Primary Examiner* — Faris S Almatrahi
*Assistant Examiner* — Sahar Motazedi
(74) *Attorney, Agent, or Firm* — Dinsmore & Shohl LLP

(57) ABSTRACT

Embodiments herein are directed to a wheelchair system that includes a wheelchair. The wheelchair includes a coupling mechanism, a processing device, and a non-transitory, processor-readable storage medium in communication with the processing device. The non-transitory, processor-readable storage medium includes one or more programming instructions that, when executed, cause the processing device to determine the location of an accessory, position the wheelchair with respect to the accessory, and couple the wheelchair to the accessory via the coupling mechanism. The positioning of the wheelchair is independent from a user physically controlling the positioning of the wheelchair with respect to the accessory.

20 Claims, 7 Drawing Sheets

(51) Int. Cl.
 *A61G 5/10* (2006.01)
 *G05D 1/02* (2020.01)
 *B60D 1/04* (2006.01)
 *B62B 5/00* (2006.01)

(52) U.S. Cl.
 CPC ........... *G05D 1/028* (2013.01); *G05D 1/0231* (2013.01); *G05D 1/0278* (2013.01); *B62B 5/002* (2013.01); *B62B 5/0016* (2013.01)

(58) Field of Classification Search
 CPC .......... A61G 5/10; B60D 1/04; B62B 5/0016; B62B 5/002
 See application file for complete search history.

(56) References Cited

U.S. PATENT DOCUMENTS

| | | |
|---|---|---|
| 2012/0159768 A1 | 6/2012 | Johnson et al. |
| 2015/0360708 A1 | 12/2015 | Benton |
| 2019/0142684 A1 | 5/2019 | Liang et al. |
| 2020/0039517 A1* | 2/2020 | Berkemeier ......... G05D 1/0231 |
| 2020/0282910 A1* | 9/2020 | Nagasamy ........... G06N 3/0454 |
| 2021/0078374 A1* | 3/2021 | Niewiadomski ....... B62D 13/00 |

FOREIGN PATENT DOCUMENTS

| | | |
|---|---|---|
| JP | 2007313980 A | 12/2007 |
| JP | 4041886 B2 | 2/2008 |
| KR | 101305336 B1 | 9/2013 |
| KR | 20160097894 A | 8/2016 |

\* cited by examiner

SYSTEMS AND METHODS FOR TRACKING AN ACCESSORY BY A WHEELCHAIR AND COUPLING THE WHEELCHAIR TO THE ACCESSORY

TECHNICAL FIELD

The present disclosure generally relates to wheelchairs and, more specifically, to wheelchairs tracking an accessory and automatically orientating the wheelchair to couple to the accessory.

BACKGROUND

Users of powered wheelchairs may also be users of independent accessories, such as shopping carts, strollers, containers, and the like. The accessories may aid in transporting objects independent from storing the object on the powered wheelchair. Further, other accessories may include an umbrella, a sunshield, and the like. Generally, accessories may be kept in various locations, such as stations in parking lots of outlet malls, shopping centers, and the like. Typically, the user has to find the accessory and manually orientate the wheelchair to mechanically couple the accessory to the wheelchair. However, because the accessory may be located in various places, the user may have to search to find the accessory. Further, due to the position of the accessory and the approach of the wheelchair to the accessory, the user may have to orientate the wheelchair such that coupling the wheelchair to the accessory is possible.

Accordingly, a need exists for tracking an accessory and automatically orientating the wheelchair to couple to the accessory.

SUMMARY

In one embodiment, a wheelchair system is provided. The wheelchair system includes a wheelchair. The wheelchair includes a coupling mechanism, a processing device, and a non-transitory, processor-readable storage medium in communication with the processing device. The non-transitory, processor-readable storage medium includes one or more programming instructions that, when executed, cause the processing device to determine the location of an accessory, position the wheelchair with respect to the accessory, and couple the wheelchair to the accessory via the coupling mechanism. The positioning of the wheelchair is independent from a user physically controlling the positioning of the wheelchair with respect to the accessory.

In another embodiment, a powered wheelchair system is provided. The powered wheelchair system includes a powered wheelchair having a user positioned thereon. The powered wheelchair includes a frame, a coupling mechanism attached to the frame, and a control unit. The coupling mechanism and the powered wheelchair are communicatively coupled to the control unit. The control unit determines a location of an accessory and coordinates positioning of the powered wheelchair with respect to the accessory independent from the user physically controlling the positioning of the wheelchair and coupling of the powered wheelchair to the accessory via the coupling mechanism.

In yet another embodiment, a method of controlling a powered wheelchair to couple to an accessory is provided. The method includes receiving, by a control unit, an input from a user, the input corresponding to a request for the accessory, determining, by the control unit, a location of the accessory, and moving, by a first actuator, the powered wheelchair to orientate the powered wheelchair with respect to the accessory into a coupling position independent from the user physically controlling the positioning of the wheelchair. The method continues by extending, by a second actuator, a coupling mechanism in a system longitudinal direction such that a first end of the coupling mechanism makes contact with the accessory and coupling, by the first end of the coupling mechanism, the accessory to the powered wheelchair.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The systems and methods described herein generally relate to a powered wheelchair configured to track an accessory and, once the powered wheelchair is within a range of distance in which the accessory may be coupled to the powered wheelchair, the powered wheelchair automatically orientates to a coupling position independently from a user control. The systems described herein are configured such that a control unit of the powered wheelchair is communicatively coupled to a communication device of the accessory. The user may request an accessory be located via a voice command, a touchscreen, a button, and the like, such that the control unit of the powered wheelchair assists in locating the accessory.

Once located, and the powered wheelchair is aligned to the accessory, a coupling mechanism may be extended from the powered wheelchair to couple onto the accessory such that the accessory is coupled to the powered wheelchair. The coupling mechanism may include an actuator and a plurality of telescoping segments in which a first end of the plurality of telescoping segments includes a fastener, such as a hook and loop, a clamp, a hook, and the like. Once coupled, the accessory and the powered wheelchair move as a single unit. In some embodiments, the accessory may be electronically tethered to the wheelchair. Further, in some embodiments, the type of accessory needed is based on the physical location of the wheelchair.

As used herein, the term "communicatively coupled" may mean that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

Figure 1:
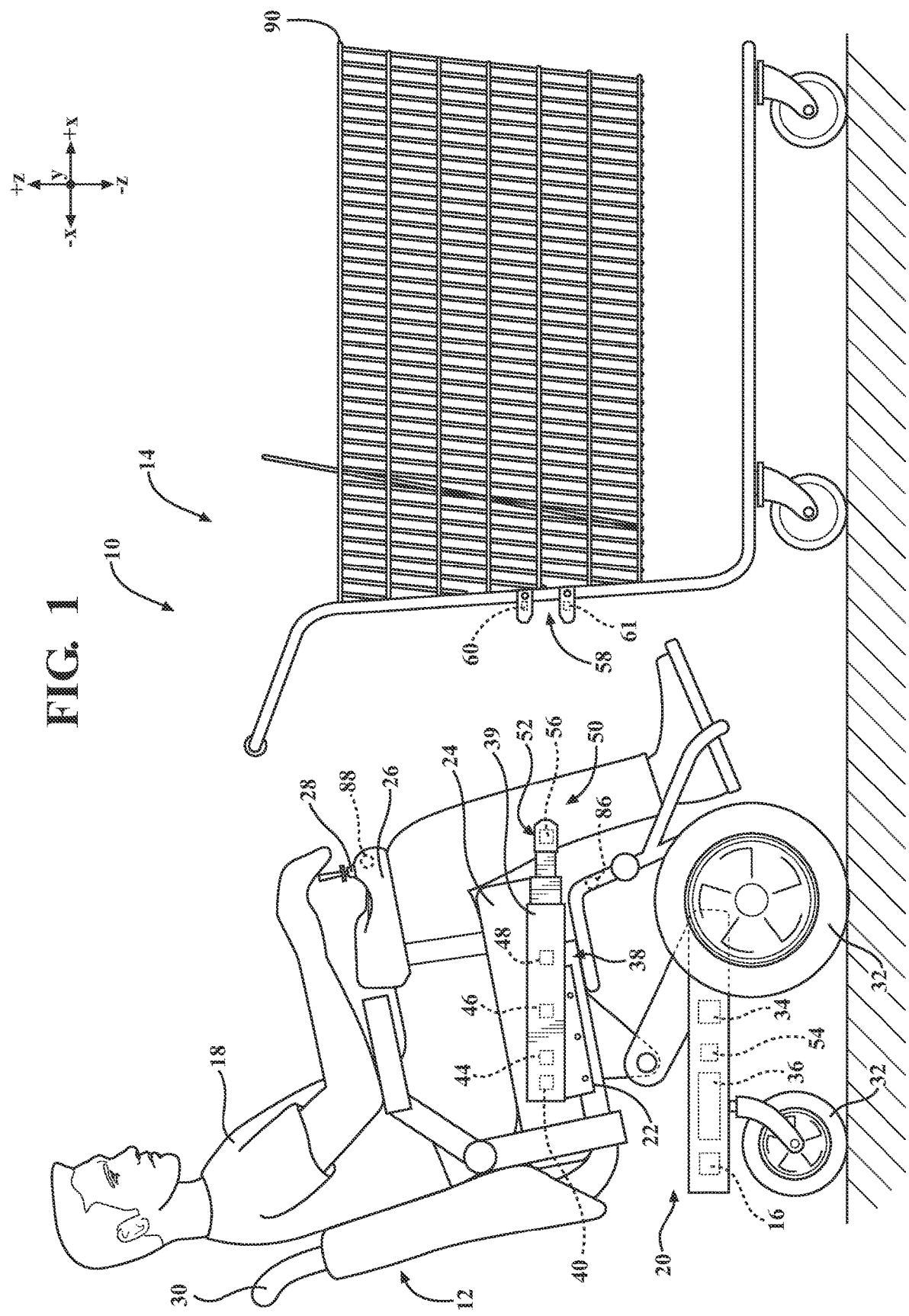
FIG. 1 schematically depicts an example wheelchair aligned with a first accessory according to one or more embodiments shown or described herein.

As used herein, the term "system longitudinal direction" refers to the forward-rearward direction of the system (i.e., in a +/−X direction of the coordinate axes depicted in FIG. 1). The term "system lateral direction" refers to the cross-direction (i.e., along the Y axis of the coordinate axes depicted in FIG. 1), and is transverse to the longitudinal direction. The term "system vertical direction" refers to the upward-downward direction of the system (i.e., in the +/−Z direction of the coordinate axes depicted in FIG. 1). As used herein, "upper" or "uppermost" is defined as generally being towards the positive Z direction of the coordinate axes shown in the drawings. "Lower" or "lowermost" is defined as generally being towards the negative Z direction of the coordinate axes shown in the drawings.

Referring initially to FIGS. 1-4, a schematic depiction of a system, generally designated 10, is provided. The system 10 generally includes a wheelchair 12 and an accessory 14. The wheelchair includes a control unit 16. The wheelchair 12 may be a powered wheelchair, but is not limited thereto. For example, the wheelchair may be a manually operated wheelchair. As described in greater detail herein, the system 10 may generally locate the accessory 14 and orientate the wheelchair 12, via the control unit 16, such that the wheelchair 12 is orientated to couple to the accessory 14.

The wheelchair 12 is a generally recognized wheelchair and, in embodiments, may be a powered wheelchair that includes motorized components that allow a user 18 to electronically control movement of the wheelchair. Accordingly, various components of the wheelchair 12 should be understood and are not described in further detail herein. In some embodiments, the wheelchair 12 may include a power base portion 20, a frame 22, and a seat portion 24 supported by the frame 22, which in turn is supported by the power base portion 20. Thus, the frame 22 is generally positioned below the seat portion 24 in a system vertical direction (i.e., positioned in the −Z direction of the coordinate axes of FIG. 1 relative to the seat portion 24) and the power base portion 20 is generally positioned below the frame 22 in a system vertical direction (i.e., positioned in the −Z direction of the coordinate axes of FIG. 1 relative to the frame 22).

Still referring to FIGS. 1-4, in some embodiments, the power base portion 20 may raise, tilt, or otherwise move the frame 22 and subsequently the seat portion 24. The frame 22 and the seat portion 24 are generally configured to support the user 18 when the user 18 is seated in the wheelchair 12. In some embodiments, the seat portion 24 may include a pair of armrests 26 to which a controller 28 may be coupled. As described herein, a controller 28 may provide the user 18 with an ability to control movement of the wheelchair 12. In some embodiments, the controller 28 may be a joystick-type controller where the user 18 directs the joystick in accordance with a desired direction and/or speed of travel. Accordingly, the controller 28 may be communicatively coupled to the power base portion 20, including various components thereof, to transmit signals to the power base portion 20 to cause the wheelchair 12 to respond according to the inputs received by the controller 28. It should be understood that the joystick configuration is merely illustrative, and in some embodiments, the controller 28 may utilize other designs, such as buttons, switches, voice controls, breath controls, and/or the like to receive inputs from a user 18 via a user interface and the like.

In some embodiments, the seat portion 24 may include one or more handles 30 integrated therein or coupled thereto. The one or more handles 30 may provide an area for the user 18 to grip the wheelchair 12. For example, at least one of the one or more handles 30 may be located on a back portion of the seat portion 24 such that the user 18 may grasp the one or more handles 30 when moving behind the wheelchair 12.

Further, mounted to the frame 22 may be a coupling mechanism 38 that includes a housing 39. The coupling mechanism 38 may extend along a plane in the system longitudinal direction (i.e., +/−X direction) and may extend parallel to the seat portion 24 in a position above the power base portion 20 in the system vertical direction (i.e., in the +/−Z direction). However, it should be understood that the coupling mechanism 38 may be mounted to anywhere on the wheelchair 12. The coupling mechanism 38 may further include at least one actuator 40 and a plurality of telescoping segments 50 that are housed within the housing 39 of the coupling mechanism 38. Each segment of the plurality of telescoping segments 50 may be a rod, a shaft, and the like. Each segment of the plurality of telescoping segments 50 may include a cavity and each cavity may have a different inner diameter such that each segment may be nested into an adjacent segment when in the retracted position. As such, each segment of the plurality of telescoping segments 50 fits within the housing 39 of the coupling mechanism 38. It should be appreciated that the length of the plurality of telescoping segments 50 is customizable for each user 18 in the vertical direction (i.e., +/−Z direction), length or longitudinal direction (i.e. +/−X direction), the angle in any direction with respect to the housing 39, and the like.

Figure 2:
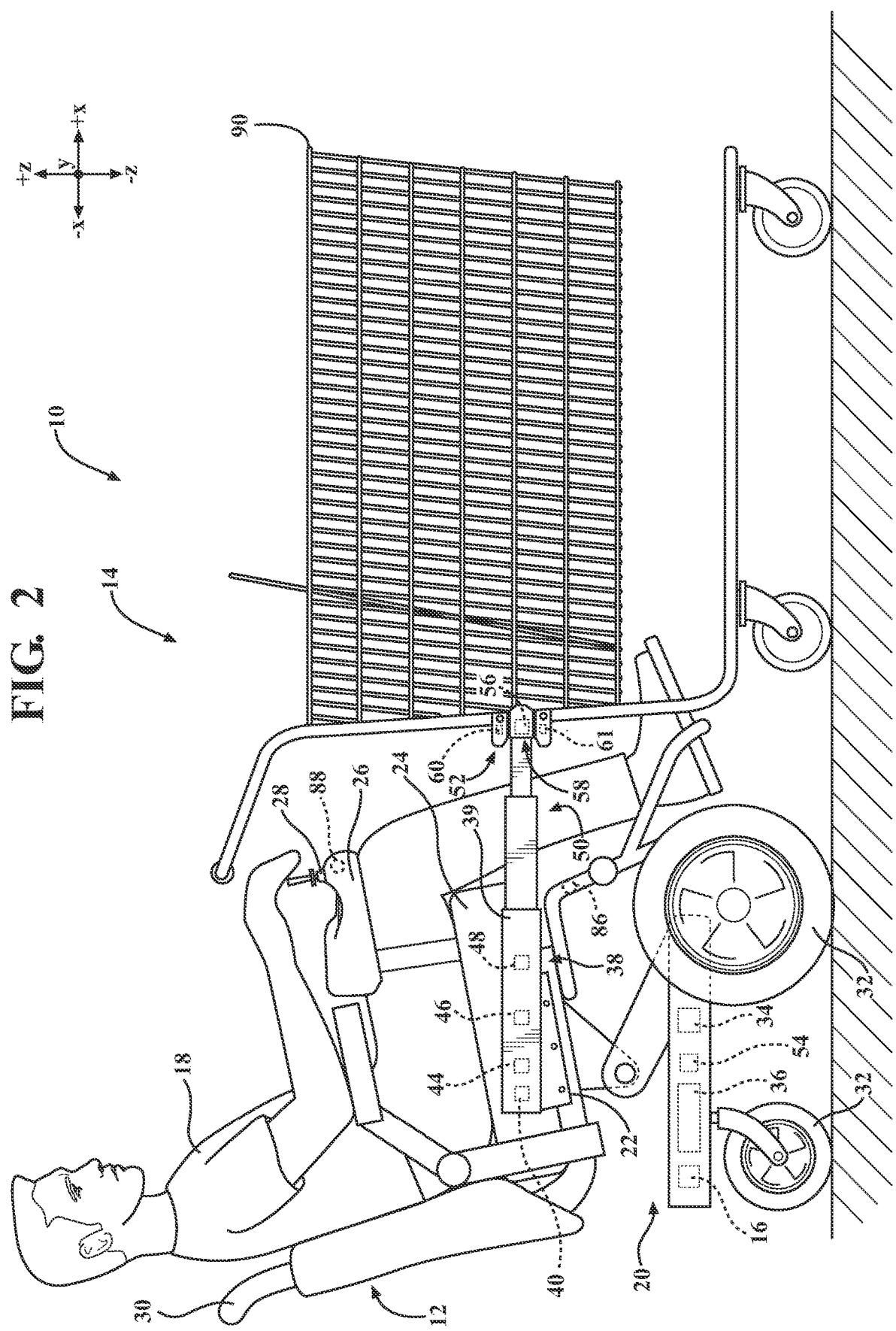
FIG. 2 schematically depicts the example wheelchair coupled to the first accessory of FIG. 1 according to one or more embodiments shown or described herein.

In some embodiments, the plurality of telescoping segments 50 may be extended electro-mechanically by the at least one actuator 40. The at least one actuator 40 is configured to actuate the plurality of telescoping segments 50 of the coupling mechanism 38 between a retracted position, as best seen in FIG. 1, and an extended position, as best seen in FIG. 2, along the same plane in the system longitudinal direction (i.e., in the +/−X direction). In some embodiments, the at least one actuator 40 is positioned somewhere other than within the coupling mechanism 38. The at least one actuator 40 may be powered by the battery 36 of the wheelchair 12. Further, in some embodiments, the coupling mechanism 38 includes a plurality of gears 44 and a clutch 46 that are each configured to work in conjunction such that the coupling mechanism 38 may be actuated between the first position and the second position. In some embodiments, a linear actuator may be used.

Still referring to FIGS. 1-4, the at least one actuator 40, the clutch 46 and/or the plurality of gears 44 may be controlled by the control unit 16 such that the control unit 16 releases the clutch 46 and the at least one actuator 40 drives the plurality of gears 44 to move the elongated member 42 between the first positon and the second position and vice versa electrically and/or automatically. Accordingly, the control unit 16 may be communicatively coupled to the coupling mechanism 38 to transmit signals to the at least one actuator 40, the clutch 46 and/or the plurality of gears 44 to cause the elongated member 42 to move between the first positon and the second position according to the inputs received by the control unit 16. It should be appreciated that electrically and/or automatically may be based on a user input. That is, in some embodiments, the controller 28 may be used to receive inputs from the user 18. In other embodiments, a button, switch, voice control, breath control, and/or the like may be utilized to receive inputs from the user 18. Further, in some embodiments, the button, switch, voice control, breath control, and/or the like may be positioned on one or both of the pair of armrests 26 and/or other positions on the wheelchair 12, or remotely controlled.

In other embodiments, the plurality of telescoping segments 50 may be extended mechanically by the user 18. That is, the clutch 46 is mechanically driven rather than electro-mechanically. In some embodiments, the user 18 may release the clutch 46 via a lever 48, or by some other mechanical and/or electrical means, and extend each of the plurality of telescoping segments 50 of the coupling mechanism 38 from the first position to the second positon and vice versa. It should be appreciated that, in some embodiments, the lever 48 may be attached to the coupling mechanism 38. In other embodiments, the lever 48 is positioned somewhere else on the wheelchair 12 as appreciated by one skilled in the art. Further yet, in some embodiments, a second person, other than the user 18, may release the clutch 46 via the lever 48.

In other embodiments, the plurality of telescoping segments 50 may be held in the housing 39 of the coupling mechanism 38 by a screw lock, and the like. That is, the housing 39 of the coupling mechanism 38 may include a threaded portion and the innermost segment of the plurality of telescoping segments 50 with reference to the housing 39 may include a fitting that may be rotated or screwed in one direction onto the threaded portion to lock the plurality of telescoping segments 50 into the housing 39 or rotated in an opposite direction to release the plurality of telescoping segments 50 from the housing. Once the plurality of telescoping segments 50 is in the extended position, the screw lock may again be rotated to lock the plurality of telescoping segments 50 in the extended position.

It should be appreciated that in the embodiments described above, the plurality of gears 44 and/or the clutch 46 keep the plurality of telescoping segments 50 locked in the extend position and/or locked in the retract position. That is, once in the extended position, the plurality of telescoping segments 50 may be held or locked in that position while the user 18 operates the wheelchair 12 coupled to the accessory 14. Further, it should be appreciated that the extended position may be adjusted or customizable based on the type of accessory 14 and/or the user 18. That is, a shopping cart accessory 90 may be positioned a certain distance from the wheelchair 12 and a stroller accessory 92 may be positioned a different distance from the wheelchair 12. Further, it should be appreciated that in various embodiments, the accessory 14 electronically tethers itself to the wheelchair 12 and there is not a need for the coupling mechanism 38.

Figure 3:
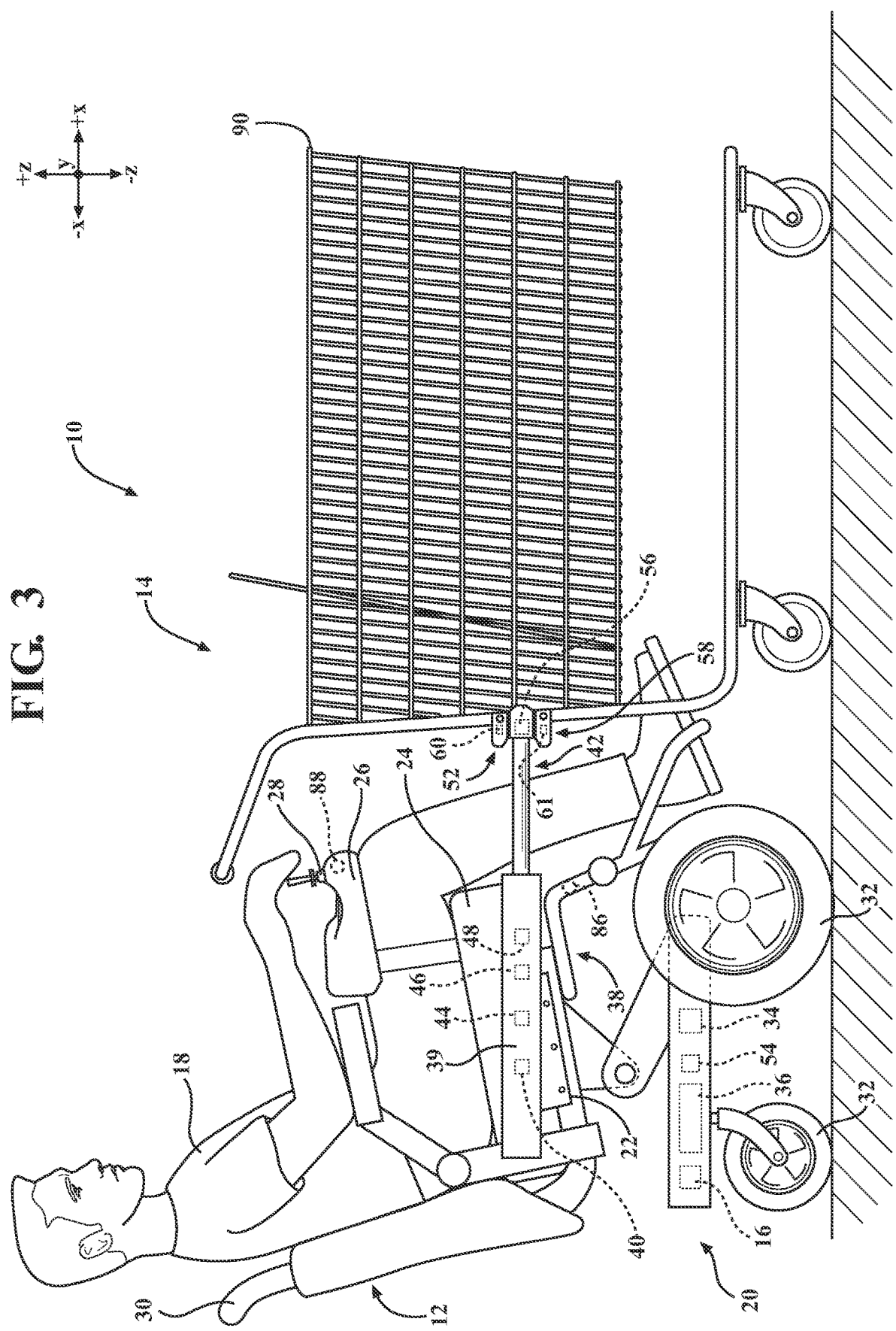
FIG. 3 schematically depicts a second example wheelchair coupled to the first accessory of FIG. 1 according to one or more embodiments shown or described herein.
Figure 4:
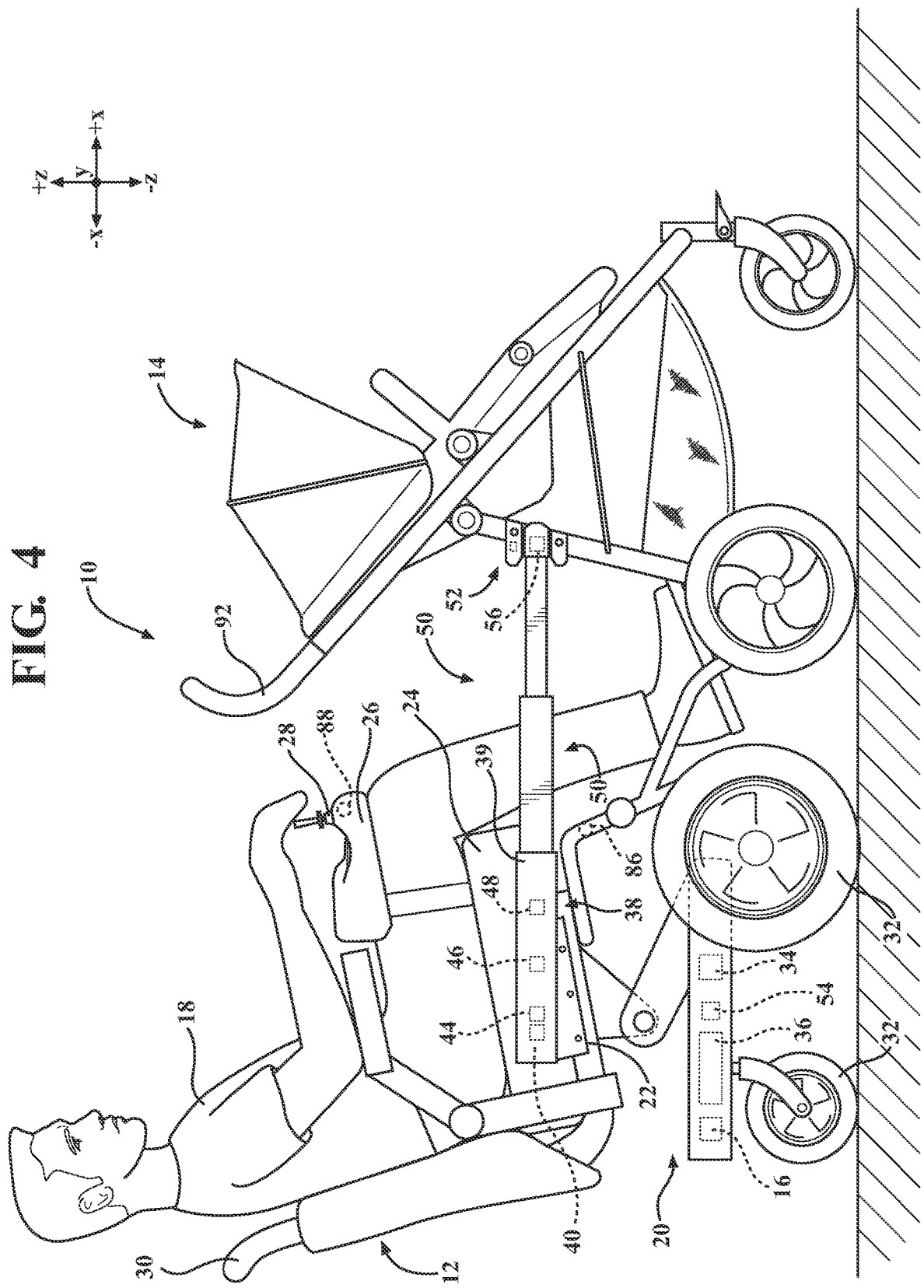
FIG. 4 schematically depicts the example wheelchair of FIG. 1 coupled to a second accessory according to one or more embodiments shown or described herein.

Now referring to FIG. 3, in some embodiments, the plurality of telescoping segments 50 may be an elongated member 42 housed within the housing 39 of the coupling mechanism 38. The elongated member 42 may be a rod, a shaft, and the like. In some embodiments, the coupling mechanism 38 may include a resilient member instead or in addition to the elongated member 42. The at least one actuator 40 is configured to actuate the elongated member 42 of the coupling mechanism 38 between the retracted position and the extended position along the same plane in the system longitudinal direction (i.e., in the +/−X direction), in a similar manner as described with respect to the plurality of telescoping segments 50 herein.

In some embodiments, the elongated member 42 may be extended electro-mechanically by the at least one actuator 40. The at least one actuator 40 is configured to actuate the elongated member 42 of the coupling mechanism 38 between the retracted position and the extended position. The at least one actuator 40 may be powered by the battery 36 of the wheelchair 12. That is, the at least one actuator 40, the clutch 46 and/or the plurality of gears 44 may be controlled by the control unit 16 such that the control unit 16 releases the clutch 46 and the at least one actuator 40 drives the plurality of gears 44 to move the elongated member 42 between the retracted positon and the extend position and vice versa electrically and/or automatically. Accordingly, the control unit 16 may be communicatively coupled to the coupling mechanism 38 to transmit signals to the at least one actuator 40, the clutch 46 and/or the plurality of gears 44 to cause the elongated member 42 to move according to the inputs received by the control unit 16, in a similar manner to that described with respect to the plurality of telescoping segments 50 above.

In other embodiments, the clutch 46 is mechanically driven rather than electro-mechanically. That is, in some embodiments, the user 18 may release the clutch 46 via a lever 48, or by some other mechanical and/or electrical means, and extend the elongated member 42 of the coupling mechanism 38 from the retracted position to the extended positon and vice versa. It should be appreciated that, in some embodiments, the lever 48 may be attached to the coupling mechanism 38. In other embodiments, the lever 48 is positioned somewhere else on the wheelchair 12 as appreciated by one skilled in the art. Further yet, in some embodiments, a second person, other than the user 18, may release the clutch 46 via the lever 48.

It should be appreciated that in some embodiments, the distance, the angle, and the like, that the elongated member 42 of the coupling mechanism 38 travels when actuated between the retracted position and the extend position, either manually or automatically, is adjustable such that it is customizable for each user 18, each accessory 14, and the like.

Now referring back to FIGS. 1-4, it should be appreciated that for brevity concerns, only the plurality of telescoping segments 50 will be further discussed. However, it should be appreciated that the elongated member 42 may be substituted for the plurality of telescoping segments 50 such that the embodiments described herein may apply to either the elongated member 42 and/or the plurality of telescoping segments 50.

The plurality of telescoping segments 50 of the coupling mechanism 38 may further include a first end 52 and an opposite second end. The second end may be coupled to the at least one actuator 40 such that upon an actuation, the first end 52 extends in the system longitudinal direction (i.e., in the +/−X direction). In other embodiments, the first end 52 may also extend in the system lateral direction (i.e., in the +/−Y direction) and/or in the system vertical direction (i.e., in the +/−Z direction). A distal portion of the first end 52 may include a coupling device 56 that is configured to couple the coupling mechanism 38 to the accessory 14. In some embodiments, the accessory 14 may further include a receiving portion 58 configured to receive the coupling device 56 of the coupling mechanism 38. The coupling device 56 may be a hook, a clamp, a hook and loop fastener, and/or the like. In some embodiments, the coupling device 56 may automatically grip, clasp, lock, retains and/or the like, the accessory 14. In other embodiments, the coupling device 56 may manually grip, clasp, retain and/or the like, the accessory 14 (e.g., the user 18 locks, grips, clasps, retains, and/or the like, the accessory 14 into the coupling device 38).

The power base portion 20 may include, but is not limited to, a plurality of wheels 32, a motor 34, a battery 36, and the control unit 16. The control unit 16 may be an electronic control unit and may generally be a control device that controls the wheelchair 12 and/or one or more components thereof. As such, the control unit 16 may be communicatively coupled to the various components of the wheelchair 12 such that one or more control signals can be transmitted from the control unit 16 to the various components such as the motor 34, as described in greater detail herein. The motor 34 may be coupled to the wheels 32 to drive movement of the wheels 32. The battery 36 may generally provide electrical power to the various components of the wheelchair 12. Further, in some embodiments, the power base portion 20 may include a global position system (GPS) device 54 that is configured to transmit the location of the wheelchair 12 and/or receive the position of other objects relative to the wheelchair 12. Other components of the power base portion 20 should generally be understood and are not described in further detail herein.

Still referring to FIGS. 1-4, the accessory 14 may include a communication device 60 that may be communicatively coupled to a battery 61. The communication device 60 may be configured to transmit a location, orientation, of the accessory 14. Further, the communication device 60 may transmit the type of the accessory, the location of the receiving portion 58 such that the coupling mechanism 38 knows the position such that the wheelchair 12 aligns the coupling mechanism 38 with the receiving portion 58 to couple to the wheelchair 12 to the accessory 14. In some embodiments, the communication device 60 may be communicatively coupled to GPS such that the location of the accessory may be transmitted wirelessly using Wi-fi, Bluetooth, and the like. In other embodiments, the accessory may transmit signals using RFID.

The receiving portion 58 may be a location on the accessory 14 configured to receive the coupling device 56 of the first end 52 of the coupling mechanism 38. In some embodiments, the receiving portion 58 may be a tubular portion of the accessory 14. In other embodiments, the receiving portion 58 may be a cavity, a void, a flat, and/or the like, that is configured to be engaged with the coupling device 56 of the first end 52 of the coupling mechanism 38. It should be appreciated that the type of receiving portion may vary based on where the receiving portion 58 is positioned on the accessory 14, the type of the accessory (i.e., a shopping cart, a stroller, an umbrella, and/or the like), and the like.

Still referring to FIGS. 1-4, in various embodiments, the wheelchair 12 may include a plurality of sensors (e.g. position sensors 86) and/or an image device 88 that may transmit a plurality of outputs, either wired or wirelessly, to the control unit 16, as explained in greater detail herein. The position sensor 86 may be a laser-based sensor, a proximity sensor, a level detection sensor, a pressure sensor, any combination thereof, and/or any other type of sensor that can detect a position of the an object relative to the sensor (i.e., the accessory 14). In various embodiments, the image device 88 may be configured to transmit image data to the to the control unit 16, which in turn processes the image to determine the type of object (i.e. the accessory 14), the orientation of the object, and the like.

Further, in various embodiments, the wheelchair 12 may be communicatively coupled to the GPS device 54 such that the location of the wheelchair 12 prompts the user 18 which type of accessory may be needed for this location. For example, when the wheelchair 12 is determined to be at a supermarket, the user 18 may be prompted to add a shopping cart 90 as the accessory 14. In another example, when the wheelchair 12 is at a shopping mall, the user 18 may be prompted to add a stroller 92 as the accessory 14. The location or position of the wheelchair 12 may be determined wirelessly using Wi-fi, Bluetooth, and the like. In other embodiments, a vehicle may be communicatively coupled to the wheelchair 12 such that the location is transmitted either from the vehicle and/or from the wheelchair 12 and through the vehicle. In some embodiments, the vehicle may be adapted to the accessory 14 when prompted by the wheelchair 12.

The control unit 16 may generally be a standalone control device that contains one or more components for controlling movement of the wheelchair 12. It should be appreciated that while the control unit is shown in FIGS. 1-4 as part of the power base portion 20 of the wheelchair 12, this is a non-limiting example. That is, the control unit 16 may be a device that is separate from the power base portion 20, such as a device that is coupled to or integrated with the pair of armrests 26, the seat portion 24, the coupling mechanism 38, and/or the like. In some embodiments, the control unit 16 may be separate from the wheelchair 12 altogether, such as, for example, a user carried computing device, the user's mobile device, and/or the like.

Figure 5:
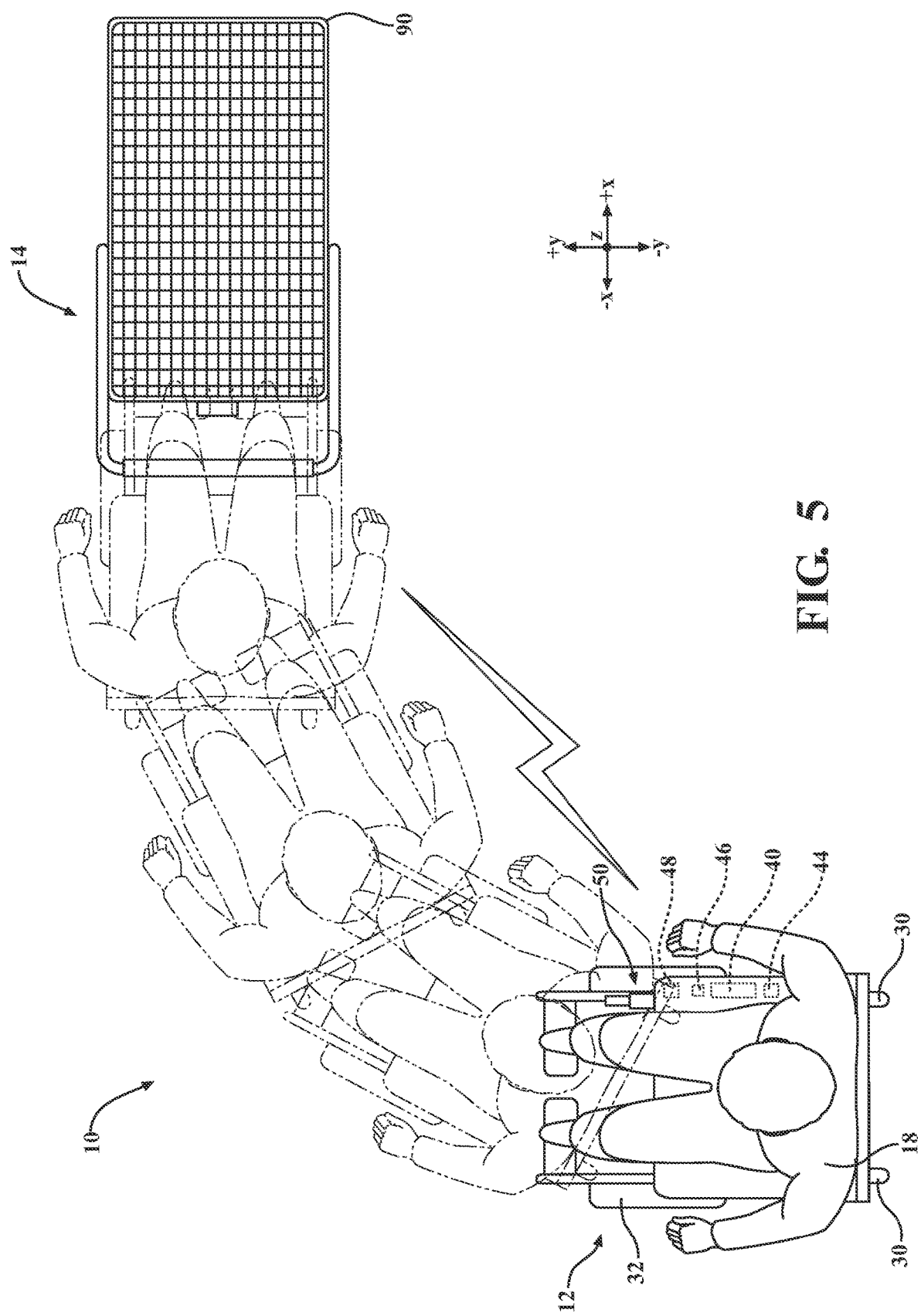
FIG. 5 schematically depicts the example wheelchair orientating itself to align with the first accessory of FIG. 1 according to one or more embodiments shown or described herein.

Now referring to FIG. 5, the wheelchair 12 is schematically depicted as orientating to align to the accessory 14. It should be appreciated that, as depicted, the wheelchair 12 has obtained the location of the accessory 14 and has rotated approximately 90 degrees to couple the wheelchair to the accessory 14. This is a non-limiting example as the orientation and alignment may be anywhere between 0 degrees and 360 degrees. Further, it should be appreciated that the wheelchair 12 orientated itself with the user 18 positioned in the seat portion 24, but without control of the user 18 after receiving the input from the user 18, as discussed herein. That is, once the wheelchair 12 is within a predetermined range of the accessory 14, the wheelchair 12 may automatically orientate itself to align into a coupling position with the accessory 14 without assistance or physical control of the wheelchair 12 from the user 18. This may be an automated process. The orientation of the wheelchair 12 may be achieved via an RFID communication between the wheelchair and the accessory, via a GPS communication between the wheelchair and the accessory, via other wireless communication between the wheelchair 12 and the accessory 14, and/or the like. In some embodiments, the location of the accessory 14 and the position of the accessory 14 and/or wheelchair 12 is determined either from the position sensor 86, the camera 88 and the like. Further, the camera 88 may be used to capture an image of the accessory 14 for object recognition, which then may control the wheelchair 12 to orientate with the accessory 14. It should be appreciated that at least one of these factors may be used in determining the location of the accessory 14 and then orientating or position the wheelchair 12 with respect to the accessory 14 such that the coupling mechanism 38 may extend to couple the wheelchair 12 to the accessory 14.

Figure 6:
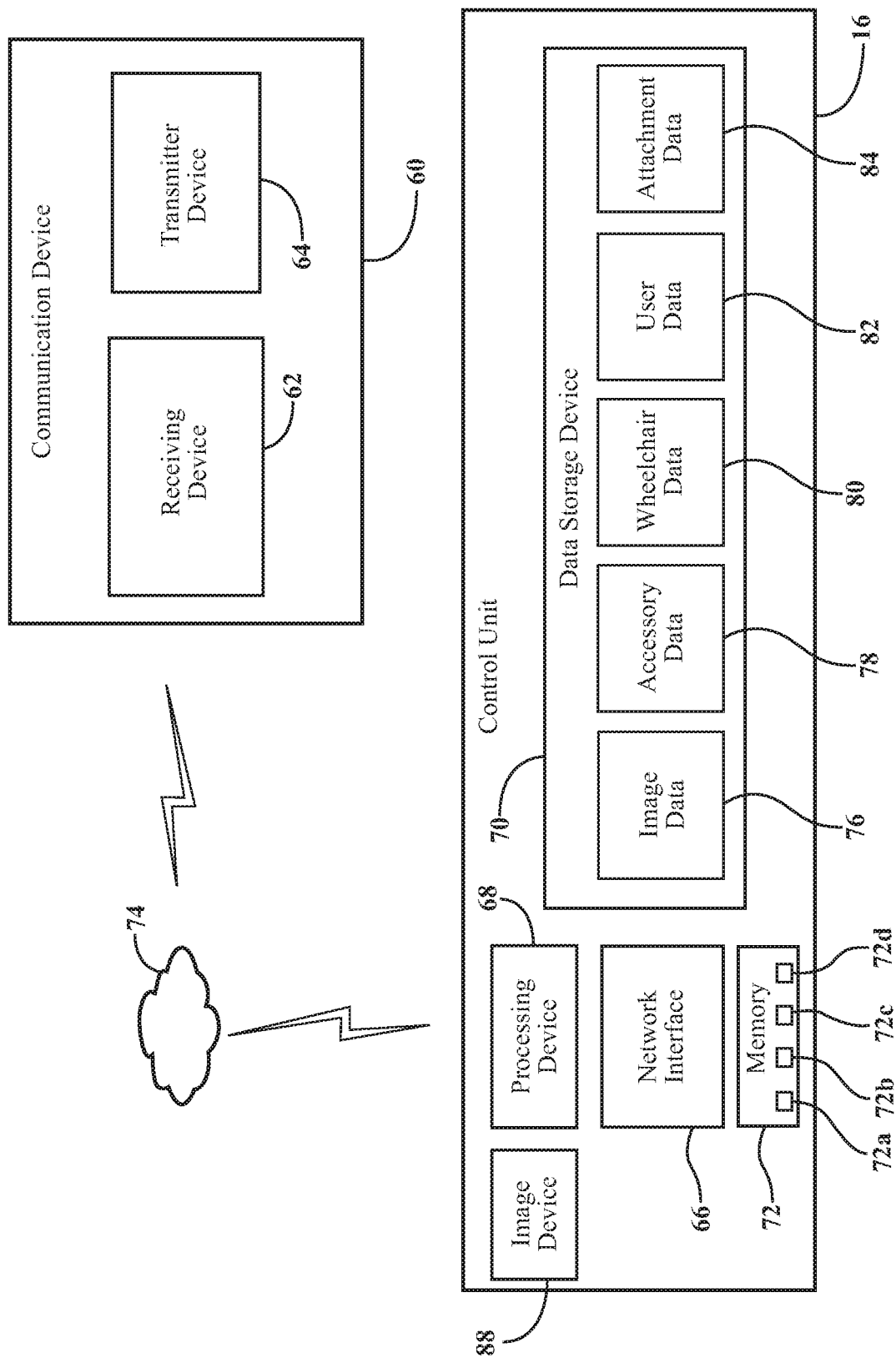
FIG. 6 schematically depicts a block diagram of illustrative components of a master controller of the example wheelchair and illustrative components of the accessory of FIG. 1 communicatively coupled together according to one or more embodiments shown or described herein.

Now referring back to FIG. 1 and to FIG. 6 in which various illustrative internal components of the control unit 16 and internal components of the communication device 60 communicatively coupled are schematically depicted. More specifically, the control unit 16 may be communicatively coupled to the communication device 60 when the communication device 60 is coupled to the wheelchair 12 (FIG. 1) (e.g. when the accessory 14 is coupled to the wheelchair 12). In some embodiments, the control unit 16 may be communicatively coupled to the communication device 60 via a network 74. The network 74 may include a wide area network (WAN), such as the Internet, a local area network (LAN), a mobile communications network, a public service telephone network (PSTN), a personal area network (PAN), a metropolitan area network (MAN), a virtual private network (VPN), and/or another network that can electronically connect the control unit 16 and the communication device 60 together.

In various embodiments, the communication device 60 may include, but is not limited to, a receiving device 62 and a transmitter device 64. The transmitter device 64, may transmit the location of the accessory, using GPS and/or other means, the type of the accessory (i.e., shopping cart, stroller, umbrella, and/or the like), the location of the receiving portion 58 on the accessory 14, and perform general processing for the accessory 14 such as calculations and logic operations to execute a program. That is, the transmitter device 64, alone or in conjunction with the other components, may be an illustrative processing device, computing device, processor, or combination thereof.

In some embodiments, the receiving device 62 may be configured to receive communications from the wheelchair 12 such as location communication, orientation communications and the like. The receiving device 62 may be communicatively coupled to the transmitter device 64 such that any communications received by the receiving device 62 may be sent to the transmitter device 64.

In various embodiments, the control unit 16 includes a network interface 66, a processing device 68, a data storage device 70, a memory component 72 and the image device 88. The processing device 68, such as a computer processing unit (CPU), may be the central processing unit of the control unit 16, performing calculations and logic operations to execute a program. The processing device 68, alone or in conjunction with the other components, is an illustrative processing device, computing device, processor, or combination thereof. The processing device 68 may include any processing component configured to receive and execute instructions (such as from the memory component 72).

In some embodiments, the memory component 72 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 72 may be a non-transitory, processor-readable memory. The memory component 72 may include one or more programming instructions thereon that, when executed by the processing device 68, cause the processing device 68 to complete various processes, such as one or more of the processes described herein with respect to FIG. 7.

Still referring to FIG. 6, the programming instructions stored on the memory component 72 may be embodied as one or more software logic modules, where each logic module provides programming instructions for completing one or more tasks, as described in greater detail below with respect to FIG. 7. For instance, a wheelchair movement logic module 72a may include a plurality of different pieces of logic, each of which may be embodied as a computer program, firmware, and/or software/hardware, which may be executable by the processing device 68 to cause the wheelchair 12 to move and/or orientate itself with respect to the accessory. An object recognition logic module 72b may include a plurality of different pieces of logic, each of which may be embodied as a computer program, firmware, and/or software/hardware, which may be executable by the processing device 68 to determine the type of accessory 14, to determine where the receiving portion 58 is located, the orientation of the accessory, and the like.

An accessory location logic module 72c may include a plurality of different pieces of logic, each of which may be embodied as a computer program, firmware, and/or software/hardware, which may be executable by the processing device 68 to determine the location of the accessory 14, to determine where the receiving portion 58 is located, the orientation of the accessory, and the like. An attachment logic module 72d may include a plurality of different pieces of logic, each of which may be embodied as a computer program, firmware, and/or software/hardware, which may be executable by the processing device 68 to couple the wheelchair 12 to the accessory 14 via the coupling mechanism 38.

The network interface 66 of the control unit 16 may include any wired or wireless networking hardware, such as a modem, LAN port, wireless fidelity (Wi-Fi) card, WiMax card, mobile communications hardware, and/or other hardware for communicating with other networks and/or devices. Therefore, the communication between the control unit 16, the wheelchair 12, and/or the accessory 14 may be provided through the network interface 66. In one example, the control unit 16 may wirelessly communicate with the accessory and the wheelchair 12.

It should be appreciated that the user controls, as discussed in greater detail herein, may be transmitted to the control unit 16 through the network interface 66. Further, it should be appreciated that the user 18 may select the user controls by a button, such as a push button, a switch, such as a toggle switch, and the like on the wheelchair 12 including from on the pair of armrests 26 or from a program selection initiated at an external device such as a portable computing device, smartphone, or the like.

The data storage device 70, which may generally be a storage medium, may contain one or more data repositories for storing data that is received and/or generated, and may be any physical storage medium, including, but not limited to, a hard disk drive (HDD), memory, removable storage, and/or the like. While the data storage device 70 is depicted as a local device, it should be understood that the data storage device 70 may be a remote storage device, such as, for example, a server computing device or the like. Illustrative data that may be contained within the data storage device 70 is described below with respect to FIG. 7 and includes, but is not limited to, an image data 76, an accessory data 78, a wheelchair data 80, a user data 82 generated by the user 18 and an attachment data 84.

The image data 76 may be data captured by the image device 88, data used for comparison to determine the type of accessory 14, location of the receiving portion 58, and the like. The accessory data 78 may be data related to the location of the accessory, orientation or position of the accessory, the type of accessory, and the like. The wheelchair data 80 may be data related to the location of the wheelchair, orientation or position of the wheelchair, the type of wheelchair, the type of the coupling mechanism, and the like. The user data 82 may be data related to the user request to find the accessory, to extend the coupling mechanism, contain a plurality of user specifications and/or user initiated programs, and the like. For example, the user may customize the coupling mechanism, what the user needs or wants to track at specific locations (i.e., shopping cart at a supermarket, a stroller at a shopping mall, and the like) The attachment data 84 may be data related to the coupling mechanism and the coupling of the accessory to the wheelchair, data related to the location of the receiving portion, data related to releasing the accessory, and the like.

Still referring to FIGS. 1 and 6, the control unit 16 may use data stored on the data storage device 70 to coordinate a movement or orientation of the wheelchair 12, multiple movements of the wheelchair 12, and/or extend or retract the plurality of telescoping segments 50, as discussed in greater detail herein.

In some embodiments, under one operation, the wheelchair 12 and the accessory 14 may move dependently or coupled to one another within particular parameters. As such, the particular parameters may be predetermined logic programs that are stored in the memory 72 and initiated during the coupling of the wheelchair 12 to the accessory 14. In other embodiments, the wheelchair 12 and the accessory 14 are independent from one another and either the wheelchair 12, the accessory 14, or a combination may move to couple the accessory 14 to the wheelchair 12.

It should be understood that while some of the components of FIG. 5 are illustrated as residing within the control unit 16 while others reside within the communication device 60, this is merely an example thereof. In some embodiments, one or more of the components may reside solely within the control unit 16, or, in the alternative, one or more components may be external to the communication device 60 and to the control unit 16.

Still referring to FIGS. 1 and 6, it should also be appreciated that the control unit 16 may receive new and/or updated instructions or configurations as needed. It should also be appreciated that the communication device 60 may also receive updates and/or new user initiated programs from time to time. These updates may be based on the user 18 and/or the type of wheelchair 12 and/or the type of the accessory 14. Moreover, the user 18 or a remote third party, such as an accessory manufacturer or a supermarket provider, may use an application installed on a smart device, tablet, wearable, or a computer that communicates with the control unit 16 so to select the user initiated program or to provide a manual control of the wheelchair 12 to facilitate movement, update the control unit 16, and/or further program the control unit 16.

Figure 7:
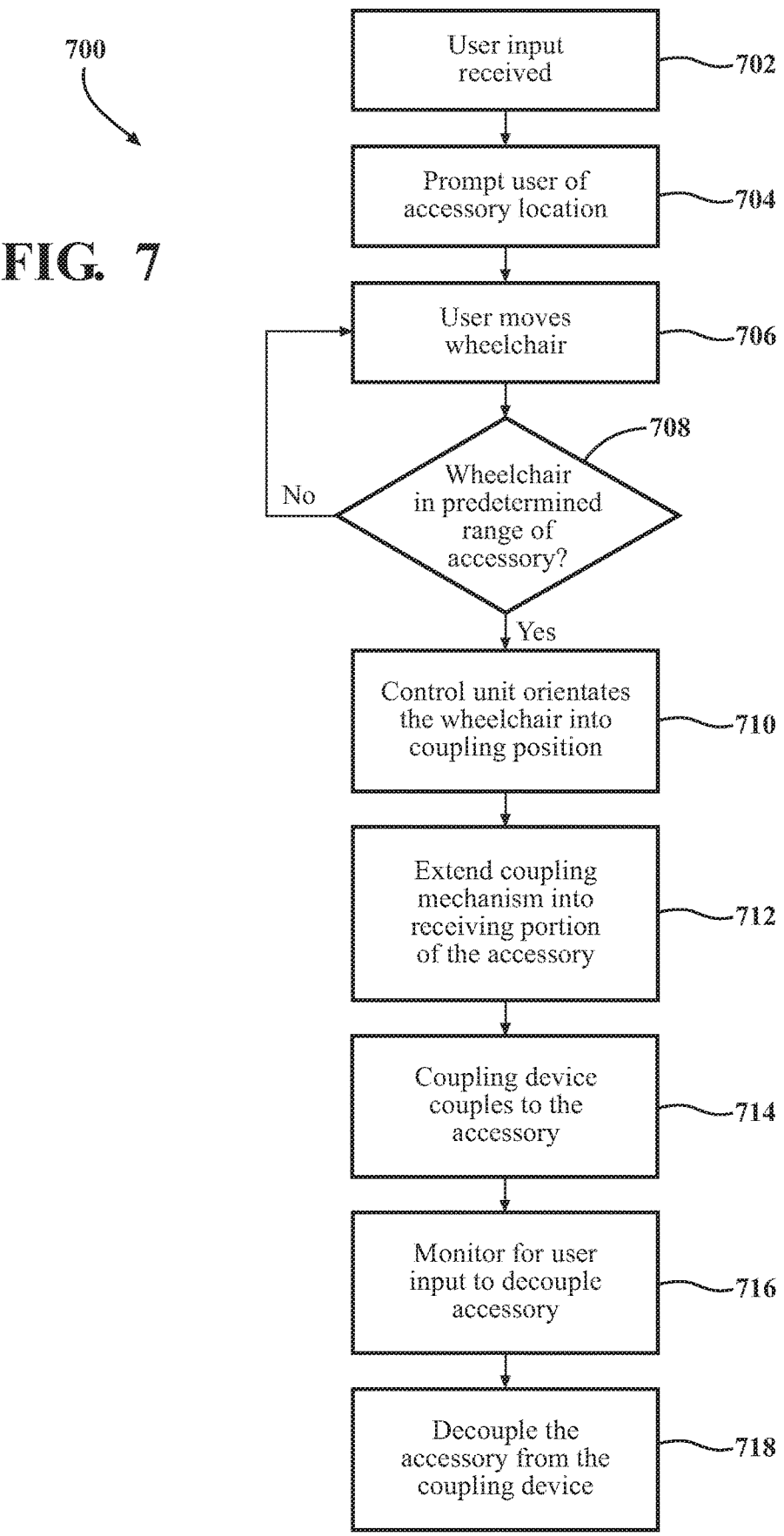
FIG. 7 depicts a flowchart of an illustrative method carried out by a control unit in communication with the wheelchair and the accessory of FIG. 1 according to one or more embodiments shown or described herein.

Now referring to FIG. 7, a flowchart of an illustrative method 700 of communication between the control unit, the wheelchair, and the accessory of FIGS. 1-5 is depicted. In some embodiments, the control unit may be in continuous communication with the wheelchair and the accessory to execute the various steps depicted in FIG. 5. The control unit may monitor for a user input that corresponds to a particular function the wheelchair, such as determining a location of the wheelchair, determining a location of the accessory, and the like, at step 702. Once the input is received, the control unit 16 may alert or prompt the user of the location of the accessory at step 704. This may be via a display, via an application for an electronic mobile device, and the like. The user may move the wheelchair, at step 706, into a predetermined range of the accessory, at step 708. If the wheelchair is not in the predetermined range of the accessory, steps 706-708 continuously repeat until the wheelchair is within the predetermined range. It should be appreciated that the predetermined range may be a range from only a few feet to a much larger area where GPS may be used to guide the wheelchair, as discussed herein. That is, in some embodiments, the rage may be acres, miles and the like, such as ranges at shopping malls and the like.

Once in the predetermined range of the accessory, the control unit may optionally instruct the wheelchair 12 (or components thereof) to automatically orientate the wheelchair into the coupling position, at step 710. The coupling position may be where the wheelchair is aligned with the accessory such that they may be coupled together. In some embodiments, the alignment may be to align the coupling device of the coupling mechanism to the receiving portion of the accessory. Once in the coupling position, the plurality of telescoping segments of the coupling mechanism is extended in the system longitudinal direction (i.e., in the +/−X direction) from the wheelchair into the receiving portion of the accessory, at step 712. It should be appreciated that the number of the plurality of telescoping segments, the length of the plurality of telescoping segments, the angle of the plurality of telescoping segments with respect to the wheelchair and the like may vary. The coupling device of the coupling mechanism couples to the accessory at step 714. It should be appreciated that the plurality of telescoping segments of the coupling mechanism may remain in a plurality of predetermined positions while coupled to the accessory.

The control unit may again monitor for any user input requests to decouple the accessory from the wheelchair at step 716. Once the input is received, the control unit may instruct the coupling mechanism (or components thereof) and/or the wheelchair 12 (or components thereof) to decouple the accessory from the coupling device of the coupling mechanism, at step 718.

It should be appreciated that the illustrative method 700 depicted in FIG. 7 indicates that the process is only in a single direction. However, this is for illustrative purposes merely to explain a single iteration or loop of the program. It should be appreciated that the process may work in reverse order to assist the user in coupling and/or decoupling the accessory to the wheelchair and vice versa.

It should now be understood that the systems and methods described herein includes the wheelchair, the accessory and the control unit. The control unit determines a location of the accessory and independently moves the wheelchair to orientate the wheelchair to the accessory via the coupling mechanism, an electronic tether, and the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A wheelchair system comprising:
    a wheelchair comprising:
        a camera;
        a coupling mechanism, and
        an electronic control unit having a processing device communicatively coupled to the camera and configured to:
            determine a location of an accessory;

instruct the camera to capture an image of the accessory;
analyze the image to recognize a type of the accessory from a plurality of different accessory types, each different accessory type from the plurality of different accessory types having a different receiving portion;
determine an orientation of the accessory and a distance to the receiving portion of the recognized type of accessory from a current position of the wheelchair;
position the wheelchair with respect to the accessory based on the recognized type of accessory, the determined orientation of the accessory and the determined distance to the receiving portion of the recognized type of accessory, and
couple the wheelchair to the receiving portion of the recognized type of accessory via the coupling mechanism such that a movement of the accessory is controlled by the wheelchair,
wherein the positioning of the wheelchair is independent from a user physically controlling the positioning of the wheelchair with respect to the accessory.

2. The wheelchair system of claim 1, wherein the electronic control unit receives a signal that corresponds to the location of the accessory.

3. The wheelchair system of claim 2, wherein the signal received by the electronic control unit is an RFID signal, the RFID signal includes information relating to the location of the accessory.

4. The wheelchair system of claim 1, wherein the electronic control unit is configured to determine a location of the wheelchair via a Global Positioning System.

5. The wheelchair system of claim 4, wherein the type of the accessory is selected based on the location of the wheelchair.

6. The wheelchair system of claim 1, wherein the wheelchair further comprises:
a frame, the coupling mechanism is mounted to the frame;
an actuator coupled to the coupling mechanism, the actuator is configured to move the coupling mechanism between a stored position and an extend position in a system longitudinal direction.

7. The wheelchair system of claim 6, wherein the coupling mechanism includes a first end, the first end is configured to couple to the accessory when the coupling mechanism is in the extend position and disengage from the accessory when the coupling mechanism is in the stored position.

8. The wheelchair system of claim 7, wherein the first end is at least one of a hook, a clamp, and a hook and loop fastener.

9. The wheelchair system of claim 1, wherein the plurality of different accessory types include at least a shopping cart and a stroller.

10. A powered wheelchair system comprising:
a powered wheelchair having a user positioned thereon, the powered wheelchair comprising:
a frame,
a coupling mechanism attached to the frame,
a camera coupled to the frame, and
an electronic control unit communicatively coupled to the camera,
wherein:
the coupling mechanism and the powered wheelchair are communicatively coupled to the electronic control unit,
the electronic control unit determines a location of an accessory, instructs the camera to capture an image of the accessory, analyzes the image to recognize a type of the accessory from a plurality of different accessory types, each different accessory type of from the plurality of different accessory types having a different receiving portion, determines an orientation of the accessory and a distance to the receiving portion of the recognized type of accessory from a current position of the powered wheelchair, coordinates positioning of the powered wheelchair with respect to the accessory, independent from the user physically controlling the positioning of the powered wheelchair, based on the recognized type of accessory, the determined orientation of the accessory and the determined distance to the receiving portion of the recognized type of accessory, and couples the powered wheelchair to the receiving portion of the recognized type of accessory via the coupling mechanism such that a movement of the accessory is controlled by the powered wheelchair.

11. The powered wheelchair system of claim 10, wherein:
the powered wheelchair further includes a first actuator coupled to the frame and configured to position the powered wheelchair.

12. The powered wheelchair system of claim 11, wherein a second actuator is positioned on the powered wheelchair and coupled to the coupling mechanism.

13. The powered wheelchair system of claim 12, wherein the coupling mechanism includes a housing and a plurality of telescoping segments housed within the housing.

14. The powered wheelchair system of claim 13, wherein the second actuator is configured to move the plurality of telescoping segments of the coupling mechanism between a stored position and an extend position in a system longitudinal direction, the plurality of telescoping segments are configured to nest into an adjacent segment when in the stored position.

15. The powered wheelchair system of claim 14, wherein one of the plurality of telescoping segments of the coupling mechanism includes a first end, the first end is configured to couple to the accessory when the coupling mechanism is in the extend position and disengage from the accessory when the coupling mechanism is in the stored position.

16. The powered wheelchair system of claim 15, wherein the first end is at least one of a hook, a clamp, and a hook and loop fastener.

17. The powered wheelchair system of claim 12, wherein the coupling mechanism includes a housing and an elongated member housed within the housing, the second actuator is configured to move the elongated member of the coupling mechanism between a stored position and an extend position in a system longitudinal direction, the elongated member includes a first end, the first end is configured to couple to the accessory when the coupling mechanism is in the extend position and disengage from the accessory when the coupling mechanism is in the stored position, the first end is at least one of a hook, a clamp, and a hook and loop fastener.

18. The powered wheelchair system of claim 10, wherein the plurality of different accessory types include at least a shopping cart and a stroller.

19. A method of controlling a powered wheelchair to couple to an accessory, the method comprising:

receiving, by an electronic control unit, an input from a user, the input corresponding to a request for the accessory;

determining, by the electronic control unit, a location of the accessory;

capturing, by a camera, an image of the accessory;

analyzing, by the electronic control unit, the image to recognize a type of the accessory from a plurality of different accessory types, each different accessory type from the plurality of different accessory types having a different receiving portion;

determining, by the electronic control unit, an orientation of the accessory and a distance to the receiving portion of the recognized type of accessory;

moving, by a first actuator, the powered wheelchair to orientate the powered wheelchair with respect to the accessory into a coupling position, independent from the user physically controlling a positioning of the powered wheelchair, based on the recognized type of accessory, the determined orientation of the accessory, and the determined distance to the receiving portion of the recognized type of accessory;

extending, by a second actuator, a coupling mechanism in a system longitudinal direction such that a first end of the coupling mechanism makes contact with the receiving portion of the recognized type of accessory; and coupling, by the first end of the coupling mechanism, the accessory to the powered wheelchair such that a movement of the accessory is controlled by the powered wheelchair.

20. The method of claim 19, wherein the location of the accessory is determined from a signal received by the electronic control unit.

* * * * *